United States Patent

Son et al.

(10) Patent No.: US 10,240,983 B2
(45) Date of Patent: Mar. 26, 2019

(54) METHOD OF ESTIMATING JUNCTION TEMPERATURE OF CONVERTER FOR VEHICLE

(71) Applicant: Hyundai Motor Company, Seoul (KR)

(72) Inventors: Gi Bong Son, Gyeonggi-do (KR); Heon Young Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 364 days.

(21) Appl. No.: 14/887,878

(22) Filed: Oct. 20, 2015

(65) Prior Publication Data

US 2016/0370233 A1 Dec. 22, 2016

(30) Foreign Application Priority Data

Jun. 16, 2015 (KR) .................. 10-2015-0085417

(51) Int. Cl.
| | |
|---|---|
| G01K 7/00 | (2006.01) |
| G01K 1/12 | (2006.01) |
| G01K 7/01 | (2006.01) |
| G01K 7/42 | (2006.01) |
| H02M 1/32 | (2007.01) |

(52) U.S. Cl.
CPC ............ G01K 7/01 (2013.01); G01K 7/42 (2013.01); *G01K 2205/00* (2013.01); *G01K 2217/00* (2013.01); *H02M 2001/327* (2013.01)

(58) Field of Classification Search
CPC .. G01K 1/00; G01K 7/01; G01K 7/00; G01K 2217/00; G01K 1/12; G01K 13/00; G01K 2205/00; H02P 29/68
USPC ....... 374/152, 141, 144, 178, 153, 145, 101, 374/103, 185, 57, 4, 135
See application file for complete search history.

(56) References Cited

U.S. PATENT DOCUMENTS

| | | | | |
|---|---|---|---|---|
| 3,548,216 | A | * | 12/1970 | Burch .................. H02M 1/06 327/124 |
| 8,780,588 | B2 | * | 7/2014 | Teraura ............ H02M 3/33584 363/127 |
| 9,689,754 | B2 | * | 6/2017 | Thogersen ............ G01K 13/00 |
| 9,719,860 | B2 | * | 8/2017 | Tang ...................... G01K 7/00 |
| 9,859,803 | B2 | * | 1/2018 | Strzalkowski .... H02M 3/33584 |
| 9,995,636 | B2 | * | 6/2018 | Jeong .................... B60R 16/02 |

(Continued)

FOREIGN PATENT DOCUMENTS

| | | |
|---|---|---|
| JP | H11-055803 A | 2/1999 |
| JP | H11-122703 A | 4/1999 |

(Continued)

OTHER PUBLICATIONS

Xu, Dewei et al., "Power Loss and Junction Temperature Analysis of Power Semiconductor Devices", IEEE Transactions on Industry Applications, vol. 38, No. 5 (Sep./Oct. 2002), pp. 1426-1431.

(Continued)

*Primary Examiner* — Gail Kaplan Verbitsky
(74) *Attorney, Agent, or Firm* — Mintz Levin Cohn Ferris Glovsky and Popeo, P.C.; Peter F. Corless

(57) ABSTRACT

A method of estimating a junction temperature of a converter for a vehicle includes: calculating, by a vehicle controller, an IGBT power loss value of the converter using an input current and an input voltage between a battery and the converter, an output voltage output from the converter to an inverter, and a duty ratio and an IGBT characteristic value of the converter.

8 Claims, 3 Drawing Sheets

(56) References Cited

U.S. PATENT DOCUMENTS

| | | | |
|---|---|---|---|
| 2007/0073510 A1 | 3/2007 | Kerkrnan et al. | |
| 2009/0058350 A1 | 3/2009 | Wei et al. | |
| 2009/0101094 A1* | 4/2009 | Mashiki | F01L 1/352 123/90.17 |
| 2010/0273072 A1* | 10/2010 | Hasegawa | B60L 3/0023 429/431 |
| 2011/0279085 A1* | 11/2011 | Shigemizu | H01M 10/441 320/117 |
| 2012/0221287 A1* | 8/2012 | Ioannidis | G01K 1/12 702/132 |
| 2012/0221288 A1* | 8/2012 | Ioannidis | G01N 25/18 702/136 |
| 2015/0211938 A1* | 7/2015 | Imakiire | H02M 1/32 702/133 |
| 2016/0041567 A1* | 2/2016 | Ko Thet | H02P 9/42 290/7 |
| 2018/0012983 A1* | 1/2018 | Udrea | H01L 29/7397 |

FOREIGN PATENT DOCUMENTS

| | | |
|---|---|---|
| JP | 2013-048513 A | 3/2013 |
| JP | 2013-084666 A | 5/2013 |
| JP | 2014-023263 A | 2/2014 |
| JP | 2015-029395 A | 2/2015 |
| KR | 1997-0036355 A | 7/1997 |
| KR | 10-1294064 B1 | 8/2013 |
| KR | 10 2014 0007877 A | 1/2014 |
| KR | 10-2014-0076168 | 6/2014 |
| KR | 10-1443854 B1 | 9/2014 |

OTHER PUBLICATIONS

N. Rao et al., "Calculating power losses in an IGBT Module," Application Note AN6156-1, <www.dynexsemi.com>, Sep. 2014.

KIPO Notice of Allowance dated Jul. 26, 2017 in regard to corresponding Korean Patent Application No. 10-2015-0085417.

\* cited by examiner

METHOD OF ESTIMATING JUNCTION TEMPERATURE OF CONVERTER FOR VEHICLE

CROSS REFERENCE TO RELATED APPLICATION

The present application claims under 35 U.S.C. § 119(a) the benefit of Korean Patent Application No. 10-2015-0085417 filed on Jun. 16, 2015, which is incorporated by reference herein in its entirety.

BACKGROUND (a) Technical Field

The present invention relates to a method of estimating a junction temperature of a converter for a vehicle by applying a duty ratio in a different manner depending on a load region of the converter.

(b) Description of the Related Art

Generally, in eco-friendly vehicles, a converter serves to convert a voltage supplied from a high voltage battery into a low voltage. Therefore, the converter is applied with a high voltage, and load(s) are connected to various apparatuses, and as a result a considerable amount of heat is generated.

However, electric devices such as a diode and a capacitor that constitute the converter are vulnerable to high temperatures, and therefore the temperature of the converter has a great effect on durability and efficiency of the converter. Therefore, to increase the operational efficiency of the converter and improve the durability of the converter, it is important to appropriately maintain the temperature of the converter.

For this purpose, a method of determining a temperature of a converter and lowering the temperature of the converter based on the determined temperature is needed.

In connection with this, various control techniques of measuring temperature of a converter and cooling the converter based on the measured temperature have been proposed. Among those, a prior art proposes a method of calculating a temperature of a converter by measuring a temperature of air introduced into a power module and controlling the temperature of the converter using a cooling fan based on the calculated temperature.

However, the method of measuring the temperature of air introduced into the power module based on the prior art may indirectly estimate the temperature of the converter, and therefore it is difficult to accurately calculate the temperature of the converter. Further, when the existing cooling method uses a water cooling type, not an air cooling type, the existing measuring method may not be applied. In the case of using the water cooling type, the existing method has the problem in that the temperature of the converter may not be estimated.

The matters described as the related art have been provided only for assisting in the understanding for the background of the present invention and should not be considered as corresponding to the related art known to those skilled in the art.

SUMMARY

An object of the present invention is to provide a method of estimating a junction temperature of a converter which is capable of accurately estimating the junction temperature in order to improve an over temperature protection and fault diagnosis function of the converter.

According to an exemplary embodiment of the present invention, there is provided a method of estimating a junction temperature of a converter for a vehicle, comprising: calculating, by a vehicle controller, an IGBT power loss value of the converter using an input current and an input voltage between a battery and the converter, an output voltage output from the converter to an inverter, and a duty ratio and an IGBT characteristic value of the converter.

When the input current flows in a forward direction from the battery to the converter, a duty ratio of the converter may be set to be a first duty ratio and when the input current flows in a reverse direction from the converter to the battery, the duty ratio of the converter is set to be a second duty ratio.

When the input current alternately flows in the forward direction from the battery to the converter and in the reverse direction from the converter to the battery, the duty ratio of the converter may be set to be a third duty ratio.

The first duty ratio may be a value larger than the second duty ratio.

The first duty ratio may be a value larger than the second duty ratio and the second duty ratio is a value larger than the third duty ratio.

The method may further includes estimating, by the vehicle controller, the conversion junction temperature of the vehicle by multiplying a thermal coefficient of resistance and a conversion coefficient of the converter by the IGBT power loss value derived by the vehicle controller and summing the multiplied value and a temperature value of cooling water of the converter.

The temperature value of cooling water of the converter may be derived through a temperature sensor installed in a cooling passage of the converter.

The conversion coefficient value may be calculated using a thermal time constant value of an RC filter installed in the converter and a flow rate of a cooling passage of the converter measured by a flow rate sensor which is installed in the cooling passage of the converter.

According to another exemplary embodiment of the present invention, there is provided a system of estimating a junction temperature of a converter for a vehicle, comprising: an input value deriver configured to derive an input current and an input voltage between a battery and the converter; an output value deriver configured to derive an output voltage output from the converter to an inverter; an input current sensor configured to sense a direction of the input current; a temperature sensor configured to sense a cooling water temperature of the converter; a flow rate sensor configured to sense a flow rate of a cooling passage of the converter; and a controller configured to calculate an IGBT power loss value of the converter using the input current and the input voltage derived by the input value deriver, the output voltage output derived by the output value deriver, and a duty ratio and an IGBT characteristic value of the converter, multiply a thermal coefficient of resistance and a conversion coefficient of the converter by the calculated IGBT power loss value, and then sum a temperature value of cooling water of the converter and the multiplied value to estimate the junction temperature of the converter for the vehicle.

According to a further exemplary embodiment of the present invention, a non-transitory computer readable medium containing program instructions executed by a processor includes: program instructions that calculate an IGBT power loss value of a converter of a vehicle using an input current and an input voltage between a battery and the converter, an output voltage output from the converter to an inverter, and a duty ratio and an IGBT characteristic value of the converter, so as to estimate a junction temperature of the converter.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings.

Figure 1:
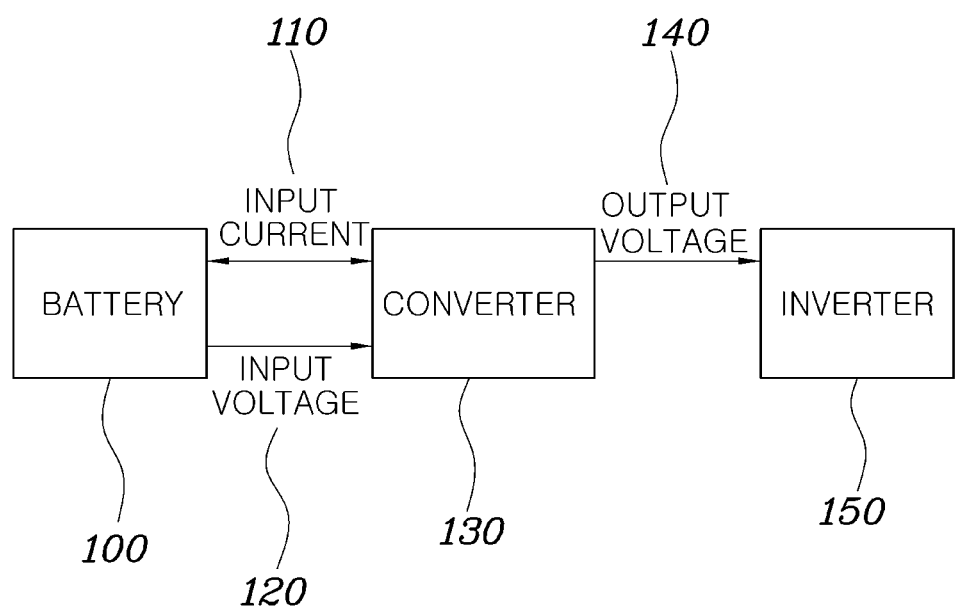
FIG. 1 is a configuration diagram among a battery, a converter, and an inverter according to an exemplary embodiment of the present invention.
Figure 3:
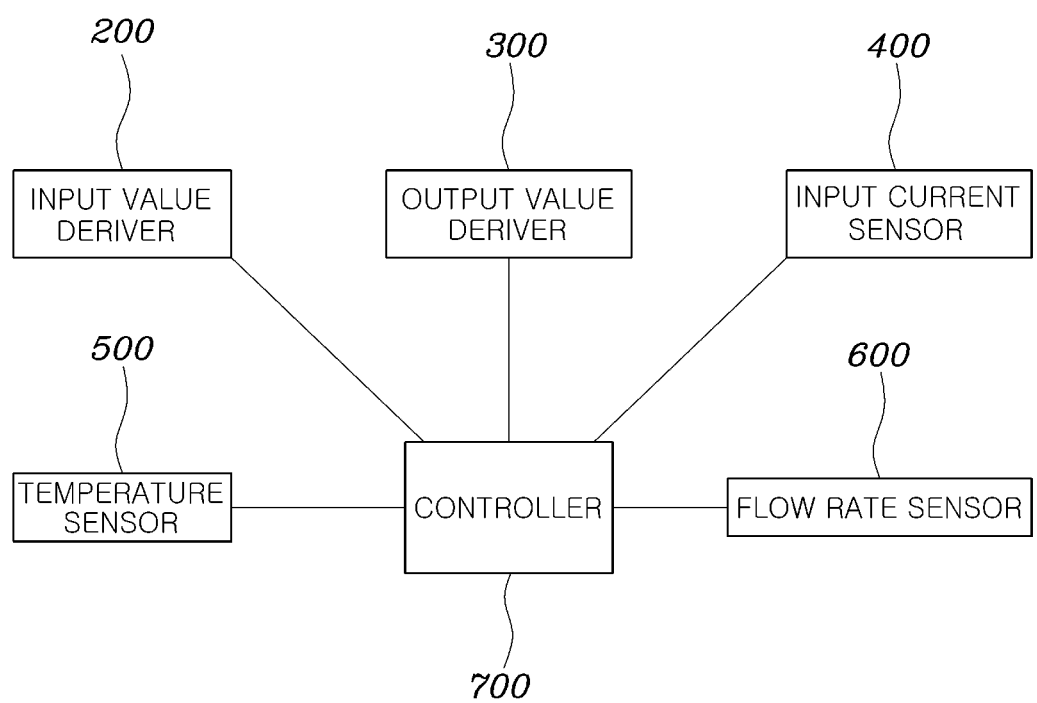
FIG. 3 is a diagram illustrating a system for estimating a junction temperature of a converter according to an exemplary embodiment of the present invention.

As illustrated in FIGS. 1 and 3, a controller 700 of a vehicle uses an input current 110 and an input voltage 120 which are input from a battery 100 to a converter 130, an output voltage 140 which is output from the converter 130 to an inverter 150, and a duty ratio and an IGBT characteristic value of the converter to calculate an IGBT power loss value of the converter 130. A unit of the IGBT power loss value is watts [W].

Hereinafter, a junction temperature of a converter for the vehicle is estimated by multiplying a thermal coefficient of resistance and a conversion coefficient of the converter by the IGBT power loss value derived from the vehicle controller 700 and then summing a temperature value of cooling water of the converter and the multiplied value.

The thermal coefficient value of resistance of the converter may have various values depending on the structure of the converter, but in the case of controlling the temperature of the converter using a water cooling type like the present invention, the thermal coefficient value of resistance may be derived using a distance between a cooling passage of the converter and a hot spot of the converter IGBT device, in which a unit is degrees C. divided by watts [° C./W].

Generally, a temperature difference value between the converter and the cooling water of the converter may be derived by multiplying the thermal coefficient value of resistance of the converter by the IGBT power loss value. However, it is inaccurate to derive the junction temperature by directly summing the temperature of the cooling water and the multiplied value. The reason is that the junction temperature is not a value changed in a step unit but is a value continuously changed, and the thermal coefficient value of resistance is changed depending on a flow rate of the cooling passage of the converter.

Therefore, to accurately estimate the junction temperature, there is a need to multiply the IGBT power loss value by the conversion coefficient in addition to the thermal coefficient value of resistance. Here, the conversion coefficient may be calculated using a thermal time constant value of an RC filter for reflecting the continuous change of the junction temperature and the flow rate value of the cooling passage of the converter.

The temperature difference value between the converter junction and the cooling water of the converter may be accurately obtained by multiplying the IGBT power loss value calculated in this manner by the thermal coefficient of resistance and the conversion coefficient. Therefore, the junction temperature of the converter may be obtained by summing the calculated temperature difference value between the converter and the cooling water and the temperature value of the cooling water of the converter.

There are various methods for deriving the temperature value of the cooling water of the converter. The temperature of the cooling water may be directly measured by installing a temperature sensor in the cooling passage of the converter and may also be derived from various map data which may output the temperature value of the cooling water of the converter. According to an exemplary embodiment of the present invention, a method of directly deriving temperature by installing the temperature sensor in the cooling passage of the converter is used to most accurately estimate the junction temperature.

In conclusion, the method of estimating junction temperature is performed by using the input current 110 and the input voltage 120 which are input from the battery 100 to the converter 130, and the output voltage 140 which is output from the converter 130 to the inverter 150, and the duty ratio and the IGBT characteristic value of the converter to calculate the IGBT power loss value of a converter, multiplying the calculated IGBT power loss value by the thermal coefficient of resistance of the converter and the conversion coefficient, and summing the temperature value of the cooling water of the converter and the multiplied value.

As described above, the thermal coefficient of resistance and the conversion coefficient of the converter and the temperature value of the cooling water of the converter correspond to a value directly derived by the sensor or a value derived by using an eigen value of the device, and therefore there is less error occurrence probability in estimating the junction temperature.

However, even though the input current 110, the input voltage 120, and the output voltage 140 of the converter in calculating the IGBT power loss value of the converter may be directly derived by the sensor, the IGBT power loss value may be changed depending on the duty ratio of the converter. Therefore, the IGBT power loss value may be considered as the factor that the error occurrence probability is highest in the method of estimating a junction temperature of a converter. Therefore, it is the most important to accurately derive the IGBT power loss value to increase the accuracy of the method of estimating a junction temperature.

The IGBT refers to a switching device. Generally, the IGBT is configured as a combination of a bipolar junction transistor (BJT) or a MOSFET device with a diode. The converter 130 also includes the IGBT. The IGBT is generally a switching device connected to the inverter 150 and is disposed between the converter 130 and the inverter 150 to act in a complimentary manner between the switching devices.

The IGBT intersects the switching devices connected between the converter 130 and the inverter 150 depending on an applied pulse width modulation (PWM) signal to repeat a turn on/off operation.

If the IGBT is ideal, the situation that a plurality of switching devices connected between the converter 130 and the inverter 150 are turned on while overlapping with each other does not occur. However, an actual ideal device is not present, and therefore a situation in which a plurality of switching devices are simultaneously turned on may occur.

In this case, the converter 130 and the inverter 150 are electrically shorted from each other, and therefore the converter 130 and the inverter 150 both may be damaged due to a short-circuit current.

Therefore, to prevent the above situation, the IGBT has a dead time. The dead time is to prevent the switching devices configuring the IGBT from being simultaneously turned on and the value of the dead time may be variously present depending on the kind of IGBT.

Therefore, to drive an accurate value by the method of obtaining an IGBT power loss value, there is a need to reflect the dead time of the IGBT as described above. The reflection of the dead time leads to the problem of the duty ratio value of the converter. Consequently, accurately deriving the duty ratio of the converter is an important factor in the method of accurately estimating a junction temperature of a converter.

The duty ratio means $T_{off}/T_d$ in a general PWM signal. $T_{off}$ means a turn off time for one period and $T_d$ means one period time. In the duty ratio of the converter, 1−input voltage/output voltage becomes the duty ratio of the converter. According to the exemplary embodiment of the present invention, the input voltage 120 means the voltage applied from the battery 100 to the converter 130 and the output voltage 140 means the voltage applied from the converter 130 to the inverter 150.

Prior to obtaining the duty ratio of the converter, there is a need to differentiate a mode depending on the state of the vehicle. The reason is that the value of the duty ratio of the converter reflecting the dead time has different values depending on the load region of the converter 130.

Therefore, the exemplary embodiment of the present invention uses a method of setting the duty ratio of the converter to a first duty ratio, when the input current 110 flows in the forward direction from the battery 100 to the converter 130, setting the duty ratio of the converter to a second duty ratio when the input current 110 flows in the reverse direction from the converter 130 to the battery 100, and setting the duty ratio of the converter to be a third duty ratio when the input current 110 alternately flows in the forward direction from the battery 100 to the converter 130 and in the reverse direction from the converter 130 to the battery 100.

Figure 2:
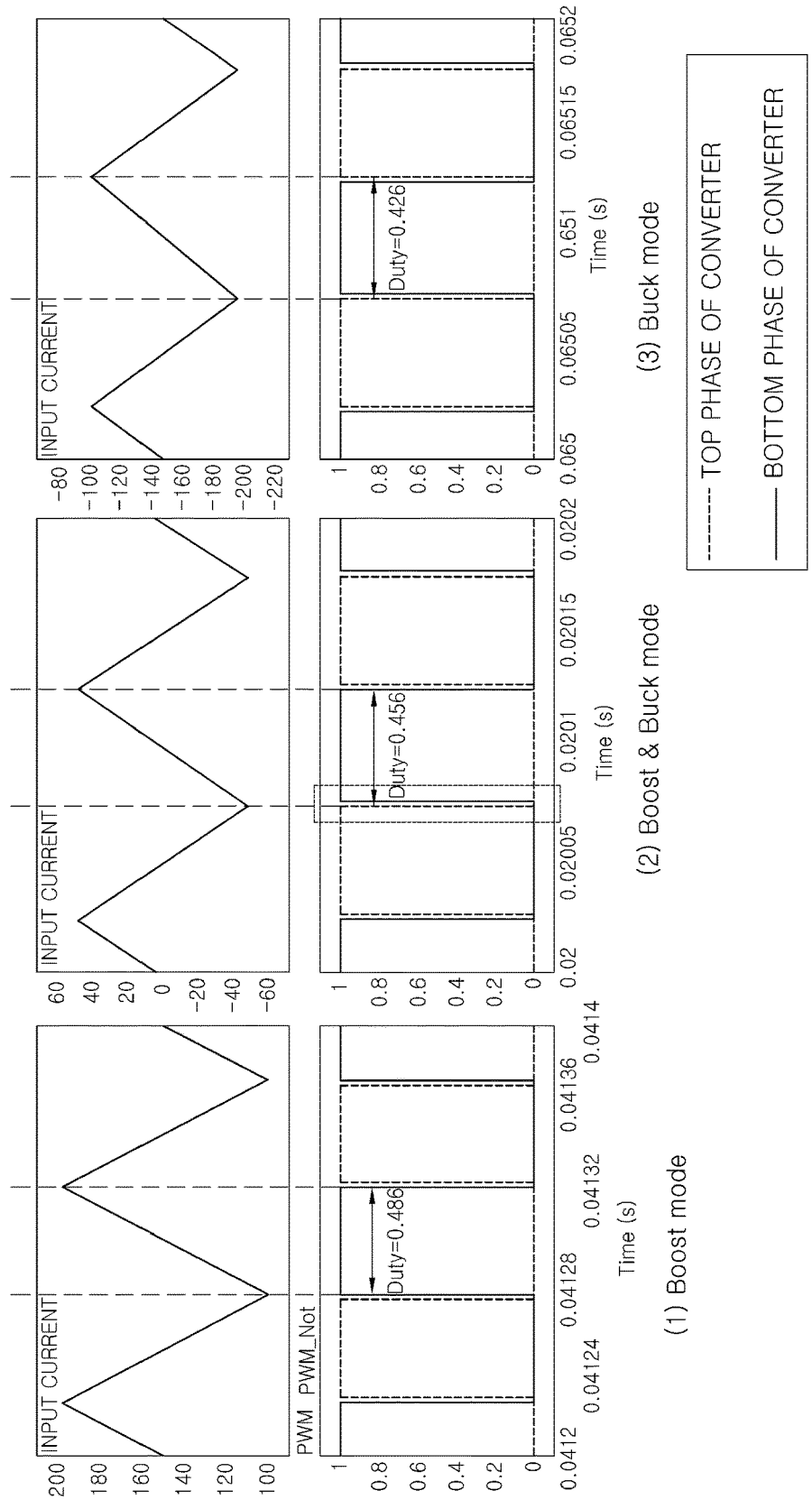
FIG. 2 is an input current and converter PWM graph depending on a load region of a converter according to an exemplary embodiment of the present invention.

This will be described in detail with reference to FIG. 2. Referring to FIG. 2, this is divided into largely three modes depending on the load region connected to the vehicle converter. As illustrated in the input current graph of FIG. 2, one mode is a boost mode and corresponds to the case in which the value of the input current 110 corresponds to a positive value. That is, the case in which the current flows in the forward direction from the battery 100 to the converter 130 and a case in which the vehicle is driving correspond to a boost mode.

Another mode, which is a buck mode, corresponds to the case in which the value of the input current 110 is a negative value in the input current graph of FIG. 2. That is, this mode corresponds to the case in which the input current 110 flows in the reverse direction from the converter 130 to the battery 100. A further mode may be generated when a vehicle is in a regenerative braking state.

An additional mode is a boost & buck mode. As illustrated in FIG. 2, the additional mode corresponds to the case in which the input current 110 alternately has a positive value and a negative value. The additional mode corresponds to the case in which the forward current and the reverse current alternately flows from the battery 100 to the converter 130, and may be generated when the boost mode and the buck mode as described above are mixed.

The duty ratios of each mode may be derived using a value that a gradient of the input current 110 of the converter is positive, as can be appreciated from a change in a top phase and a bottom phase of the converter of FIG. 2. As described above, the converter 130 reflects the dead time to prevent the short phenomenon, and therefore the top phase and the bottom phase of the converter appears in a form like the PWM graph of FIG. 2. Therefore, the time when the gradient of the input current 110 has the positive value has different values by reflecting the dead time depending on each mode.

Generally, the first duty ratio proposed by the present invention will be a value larger than the second duty ratio and the second duty ratio will be a value larger than the third duty ratio. The duty ratio depending on the load region of the converter may be expressed by the following Equation.

In the boost mode, the duty ratio becomes 1−input voltage/output voltage, in the boost & buck mode, the duty ratio becomes 1−(input voltage/output voltage+dead time× switching frequency), and in the buck mode, the duty ratio becomes 1−(input voltage/output voltage+2×dead time× switching frequency).

Therefore, depending on the above Equation, the first duty ratio which is the duty ratio in the boost mode will be the largest value, the second duty ratio in the boost & buck mode will be the second largest value, and the third duty ratio in the buck mode will be the smallest value.

Depending on the above Equation, when the input voltage 120 is 360 V, the output voltage 140 is 700 V, the dead time is 3 μs, and the switching frequency is 10 kHz, the duty ratio of the converter of each mode has a 0.486 value in the case of the boost mode, a 0.456 value in the boost & buck mode, and a 0.426 value in the buck mode. The above values are an example of the present invention and may be confirmed as shown in the PWM graph of FIG. 2.

Comparing the above examples, it may be confirmed that the duty ratios of the converter depending on the load region state of the converter largely have a difference of about 6%. Therefore, the difference may be reflected to the derivation of the IGBT power loss value as it is, and as a result has an effect on the estimation of the junction temperature as it is. The difference of about 6% leads to an error of about 6° C. in estimating the junction temperature.

The error may lead to a severe error in the over temperature protection and fault diagnosis function of the converter, which causes the degradation in efficiency and durability of the converter.

Therefore, the exemplary embodiment of the present invention proposes a method of estimating a junction temperature of a converter by calculating the duty ratios of the converter for each mode depending on the load region of the converter using the above Equation of calculating the duty ratio of the converter described above to reduce the above error. Further, this may improve the over temperature and fault diagnosis function of the converter and therefore the occurrence probability of misdiagnosis and wrong measure of the vehicle converter is reduced, thereby improving the marketability of the converter.

As illustrated in FIGS. 1 and 3, the system of estimating a junction temperature according to the exemplary embodiment of the present invention is configured to include an input value deriver 200 which derives the input current 110 and the input voltage 120 input from the battery 100 to the converter 130; an output value deriver 300 which derives the output voltage 140 output from the converter 130 to the inverter 150; an input current sensor 400 which senses the direction of the input current 110; a temperature sensor 500 which senses the cooling water temperature of the converter 130; a flow rate sensor 600 which senses a flow rate of the cooling passage of the converter 130; and the controller 700 which calculates the IGBT power loss value of the converter using the input current 110 and the input voltage 120 input from the battery 100 to the converter 130, the output voltage 140 output from the converter 130 to the inverter 150, and the duty ratio and the IGBT characteristic value of the converter, multiplies the thermal coefficient of resistance and the conversion coefficient of the converter by the calculated IGBT power loss value, and then sums the temperature value of cooling water of the converter and the multiplied value to estimate the junction temperature of the converter for the vehicle.

The input value deriver 200 derives the values of the input current 110 and the input voltage 120 applied from the battery 100 to the converter 130 and transfers the derived values to the controller 700, and the output value deriver 300 derives the value of the output voltage 140 applied from the converter 130 to the inverter 150 and transfers the derived value to the controller 700.

To divide three modes depending on the load region of the converter illustrated in FIG. 2, the input current sensor 400 senses the direction of the input current 110 applied from the battery 110 to the converter 130 to transfer the information to the controller 700. As described above, the input current sensor 400 senses whether the input current 110 flows in the forward direction from the battery 100 to the converter 130, flows in the reverse direction from the converter 130 to the battery 100, or alternately flows in the forward direction and the reverse direction.

Here, a determination criterion on whether the input current 100 alternately flows in the forward direction and the reverse direction is based on one period of the PWM signal applied to the IGBT of the converter. For example, when the switching frequency of the converter is 10 kHz, 100 µs is one period and therefore it is sensed whether the input current 110 alternately flows in the forward direction and the reverse direction for 100 µs.

The temperature sensor 500 derives the temperature of the cooling water flowing in the cooling passage of the converter and transfers the value to the controller 700 and the flow rate sensor 600 measures the flow rate of the cooling passage and transfers the value to the controller 700.

The controller 700 derives the duty ratio of the converter based on the information transferred from the input current sensor 400 and uses the value transferred through the input value deriver 200, the output value deriver 300, the temperature sensor 500, and the flow rate sensor 600 to estimate the junction temperature of the vehicle.

As described above, the following effects may be obtained by estimating the junction temperature of the converter for the vehicle.

First, the junction temperature may be accurately estimated to prevent the over temperature protection and fault diagnosis function from being instable due to the inaccurate estimation of the junction temperature.

Second, even though the cooling method of the converter uses the water cooling type, not using the air cooling type, the junction temperature may be accurately calculated.

Third, since the duty ratio of the converter in response to the change in the load region connected to the converter is differently applied to estimate the junction temperature, even though the load region connected to the converter is changed, the junction temperature reflecting the changed load region may be accurately calculated.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A method of estimating a junction temperature of a converter for a vehicle, comprising the steps of:
   calculating, by a vehicle controller, an IGBT power loss value of the converter using an input current and an input voltage between a battery and the converter, an output voltage output from the converter to an inverter, and a duty ratio and a predetermined IGBT characteristic value of the converter and a temperature value of cooling water of the converter; and
   estimating, by the vehicle controller, the junction temperature of the converter by multiplying a thermal coefficient of resistance and a conversion coefficient of the converter by the IGBT power loss value derived by the vehicle controller and summing the multiplied value and a temperature value of cooling water of the converter,
   wherein the junction temperature is used to improve an over temperature protection and fault diagnosis function of the converter.

2. The method of claim 1, wherein when the input current flows in a forward direction from the battery to the converter, a duty ratio of the converter is set to be a first duty ratio and when the input current flows in a reverse direction from the converter to the battery, the duty ratio of the converter is set to be a second duty ratio.

3. The method of claim 2, wherein when the input current alternately flows in the forward direction from the battery to the converter and in the reverse direction from the converter to the battery, the duty ratio of the converter is set to be a third duty ratio.

4. The method of claim 2, wherein the first duty ratio is a value larger than the second duty ratio.

5. The method of claim 3, wherein the first duty ratio is a value larger than the second duty ratio, and the second duty ratio is a value larger than the third duty ratio.

6. The method of claim 1, wherein the temperature value of cooling water of the converter is derived through a temperature sensor installed in a cooling passage of the converter.

7. A system of estimating a junction temperature of a converter for a vehicle, comprising:
   an input value deriver configured to derive an input current and an input voltage between a battery and the converter;
   an output value deriver configured to derive an output voltage output from the converter to an inverter;
   an input current sensor configured to sense a direction of the input current; a temperature sensor configured to sense a cooling water temperature of the converter; a flow rate sensor configured to sense a flow rate of a cooling passage of the converter; and
   a controller configured to calculate an IGBT power loss value of the converter using the input current and the input voltage derived by the input value deriver, the output voltage output derived by the output value deriver, and a duty ratio and a predetermined IGBT characteristic value of the converter, multiply a thermal coefficient of resistance and a conversion coefficient of the converter by the calculated IGBT power loss value, and then sum a temperature value of cooling water of the converter and the multiplied value to estimate the junction temperature of the converter for the vehicle, wherein the junction temperature is used to improve an over temperature protection and fault diagnosis function of the converter.

8. A non-transitory computer readable medium containing program instructions executed by a processor, the computer readable medium comprising:

program instructions that calculate an IGBT power loss value of a converter of a vehicle using an input current and an input voltage between a battery and the converter, an output voltage output from the converter to an inverter, and a duty ratio and a predetermined IGBT characteristic value of the converter, so as to estimate a junction temperature of the converter; and program instructions that estimate the junction temperature of the converter by multiplying a thermal coefficient of resistance and a conversion coefficient of the converter by the IGBT power loss value derived by the vehicle controller and summing the multiplied value and a temperature value of cooling water of the converter, wherein the junction temperature is used to improve an over temperature protection and fault diagnosis function of the converter.

* * * * *